US005465576A

United States Patent [19]

Miller

[11] Patent Number: 5,465,576

[45] Date of Patent: Nov. 14, 1995

[54] VENTED HYDRAULIC FLUID RESERVOIR

[75] Inventor: Douglas P. Miller, New Berlin, Wis.

[73] Assignee: Applied Power Inc., Butler, Wis.

[21] Appl. No.: 186,404

[22] Filed: Jan. 24, 1994

[51] Int. Cl.$^{6}$ .................................................... F16D 31/02

[52] U.S. Cl. .............................................................. 60/478

[58] Field of Search .............................. 60/585, 592, 478

[56] References Cited

U.S. PATENT DOCUMENTS

| | | | |
|---|---|---|---|
| 3,354,639 | 11/1967 | Yost | 60/592 |
| 3,844,534 | 10/1974 | Sessody | 254/93 |
| 3,921,399 | 11/1975 | Ishihara | 60/478 |
| 3,935,882 | 2/1976 | Matthews | 138/30 |
| 4,987,796 | 1/1991 | von Kaler et al. | 60/478 |

FOREIGN PATENT DOCUMENTS

| | | | |
|---|---|---|---|
| 173912 | 3/1986 | European Pat. Off. | 60/585 |
| 1371455 | 12/1964 | France . | |
| 1386852 | 11/1965 | France | 60/585 |
| 1916450 | 10/1970 | Germany | 60/478 |
| 2351267 | 4/1975 | Germany . | |
| 921525 | 3/1963 | United Kingdom . | |
| 2160592 | 12/1985 | United Kingdom . | |

*Primary Examiner*—F. Daniel Lopez

[57] ABSTRACT

A hydraulic fluid reservoir contains an extensible bladder which has its exterior exposed to the fluid and its interior vented to the exterior of the reservoir. The interior of the bladder is sealed from the hydraulic fluid in the reservoir. Depletion of the fluid from the reservoir results in distension of the bladder and replenishing the fluid to the reservoir collapses the bladder. The bladder is pleated and a tie-rod which holds the reservoir together extends through the bladder.

6 Claims, 3 Drawing Sheets

56
50
54
52
60
62

72
64
66

70
66

16
40
42
18
76
50
30
54
52
15
5
5

16
60
68
76
40
42
15
3
3
52
30
50
54
11
18

16
68
60
42
40
1
1
14
11
52
50
54
18
30
15

VENTED HYDRAULIC FLUID RESERVOIR

BACKGROUND OF THE INVENTION

1. Field of the Invention

This invention relates to reservoirs which store hydraulic fluid for a working unit which depletes fluid from or replenishes fluid to the reservoir on a demand basis. In particular, the invention relates to such reservoirs which are vented.

2. Discussion of the Prior Art

Many types of hydraulic working units such as hand pumps typically include a reservoir for containing hydraulic fluid to be used by the pump. The pump depletes hydraulic fluid from or replenishes hydraulic fluid to the reservoir on an as-needed basis.

When hydraulic fluid is drawn from the reservoir, a vacuum is created in the reservoir. In some reservoirs, an air pocket is provided even when the reservoir is full to reduce the magnitude of the vacuum drawn. However, this is inefficient because it does not fully the reservoir volume for fluid and pumping efficiency is reduced because of the vacuum drawin in the reservoir.

Other reservoirs have been vented to the atmosphere so that air can be drawn in to replace the depleted fluid and prevent an excessive vacuum from occurring in the reservoir. However, providing a vent in the reservoir has limited the orientation that the pump can be used in, since if it is used in an orientation which causes fluid to flow to the vent, fluid can escape from the reservoir through the vent. Also, such systems which are vented to atmosphere (or have an air pocket in the reservoir) sometimes resulted in air being introduced into the pumping system, which could cause the pump to lose prime or make the system unstable. Vented systems also sometimes resulted in contamination of the hydraulic fluid, as would occur if a contaminant entered the reservoir through the vent.

Vented hydraulic reservoirs are also known in which a fluid chamber and a vented air chamber are separated by a sliding piston. In these systems, a sliding seal had to be provided by the piston between the air and fluid chambers, which resulted in leakage, a tolerance problem, erratic performance due to friction and sticking and many of the other problems associated with systems in which the hydraulic fluid was directly vented to the atmosphere.

Non-vented reservoirs in which the reservoir is a flexible bladder, for example, an expansible flexible bladder such as an elastomeric bladder, have also been employed to avoid venting the fluid in the reservoir directly. In these reservoirs, the hydraulic fluid fills the bladder, and the bladder expands or contracts in response to fluid being added to it or depleted from it. These systems are relatively difficult to fill and also sometimes provide a resistance to fluid being replenished to the bladder by the working unit.

SUMMARY OF THE INVENTION

In a hydraulic fluid reservoir of the invention a flexible bladder resides in the fluid chamber of the reservoir and has its exterior exposed to the fluid chamber. The interior of the bladder is sealed against fluid communication with the fluid chamber, and a vent provides fluid communication between the interior of the bladder and the exterior of the reservoir. When fluid is drawn from the reservoir, air or another fluid enters the bladder through the vent and the bladder volume enlarges to displace the fluid drawn from the reservoir. Upon replenishing the fluid to the reservoir, the volume of the bladder contracts. Thereby, the pressure inside the fluid chamber is maintained at approximately equal to the pressure outside of the reservoir, regardless of the amount of fluid withdrawn from or replenished to the reservoir. This provides an economic way of providing a reservoir which is insensitive to attitude, does not leak, does not provide a path for contamination or air to enter the fluid chamber, and does not interfere with the operation of the working unit.

In one especially useful form, the bladder is pleated so that it may distend easily, with only a very little difference in pressure between its interior and exterior. Conversely, it may collapse to a compact shape when the pressure difference is reversed. The bladder may also be made of an extensible material such as an elastomer to further add to its flexibility.

In another preferred aspect, the reservoir includes a tie-rod and the tie-rod extends through the bladder. The vent to the interior of the bladder may be provided by passageways formed in the tie-rod. An end of the bladder may be sealed to an end plug which the tie-rod extends through with a fluid tight seal. In an especially preferred form, the end plug is adapted to seal against the ends of two bladders so as to accommodate reservoirs of different lengths.

These and other objects and advantages of the invention will be apparent from the following detailed description and from the drawings.

DETAILED DESCRIPTION OF THE PREFERRED EMBODIMENTS

Figure 1:
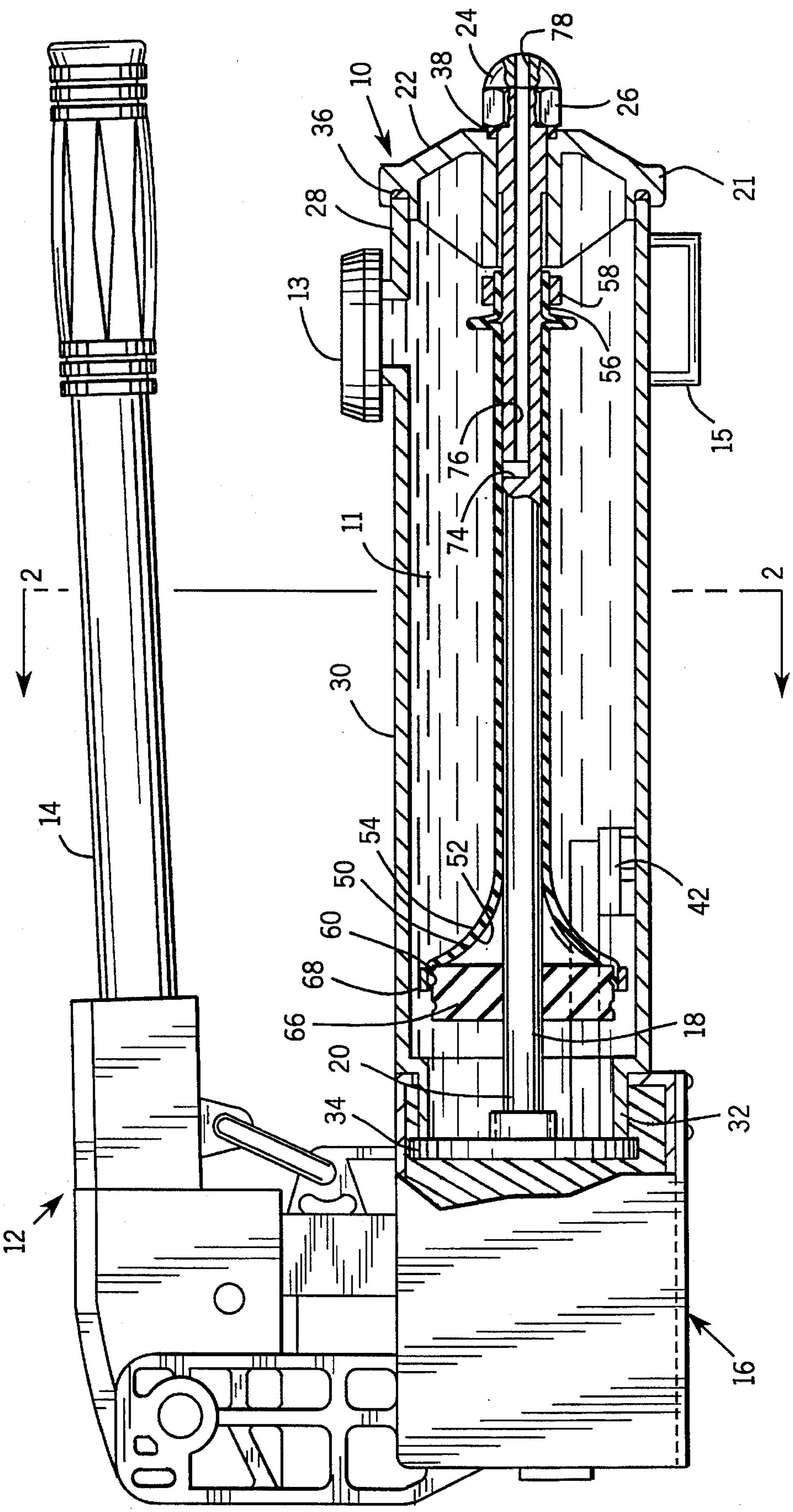
FIG. 1 is a partial cross-sectional view of a hand pump incorporating a reservoir of the invention as viewed from the plane of the line 1—1 of FIG. 2.

Referring to FIG. 1, a reservoir 10 of the invention is shown incorporated into a hydraulic hand pump 12. The hand pump 12 includes a handle 14 and a working unit 16 of any suitable design, which are well known in the art. A tie-rod 18 is secured to the working unit 16 at its proximal end 20, by any suitable means such as by a threaded connection, and extends through the reservoir 10 and through an end cap 21 which seals the distal or free end 22 of the reservoir 10. The reservoir 10 defines within it a fluid chamber 11. A fill cap 13 permits access to the interior of the chamber 11 for adding hydraulic fluid thereto. A foot 15 extends below the chamber 11 to support the pump 12 on a surface with stability in the orientation shown in FIG. 1.

A nut 24 is threaded onto the distal end 26 of the tie-rod 18 and bears against the end cap 21. The end cap 21 bears against distal end 28 of the body 30 of the reservoir 10 to hold the body 30 in compression against the working unit 16 when the nut 24 is tightened. The proximal end 32 of the body 30 is received in the working unit 16. To insure that the reservoir 10 is fluid tight, gaskets are provided at 34, 36 and 38.

As is well known in the art, the working unit 16 has a valve handle 40. When the working unit 16 is connected to a load, such as a hydraulic cylinder, to which hydraulic fluid under pressure is to be pumped, in one position of the valve handle 40, the handle 14 can be operated and hydraulic fluid withdrawn from the fluid chamber 11 of the reservoir 10 through intake 42 of the working unit 16 and supplied to the load under pressure. When it is desired to relieve the pressure supplied to the load, the valve handle 40 is switched to another position in which the hydraulic fluid is allowed to flow from the load back into the fluid chamber 11 thereby replenishing the reservoir 10.

Figure 3:
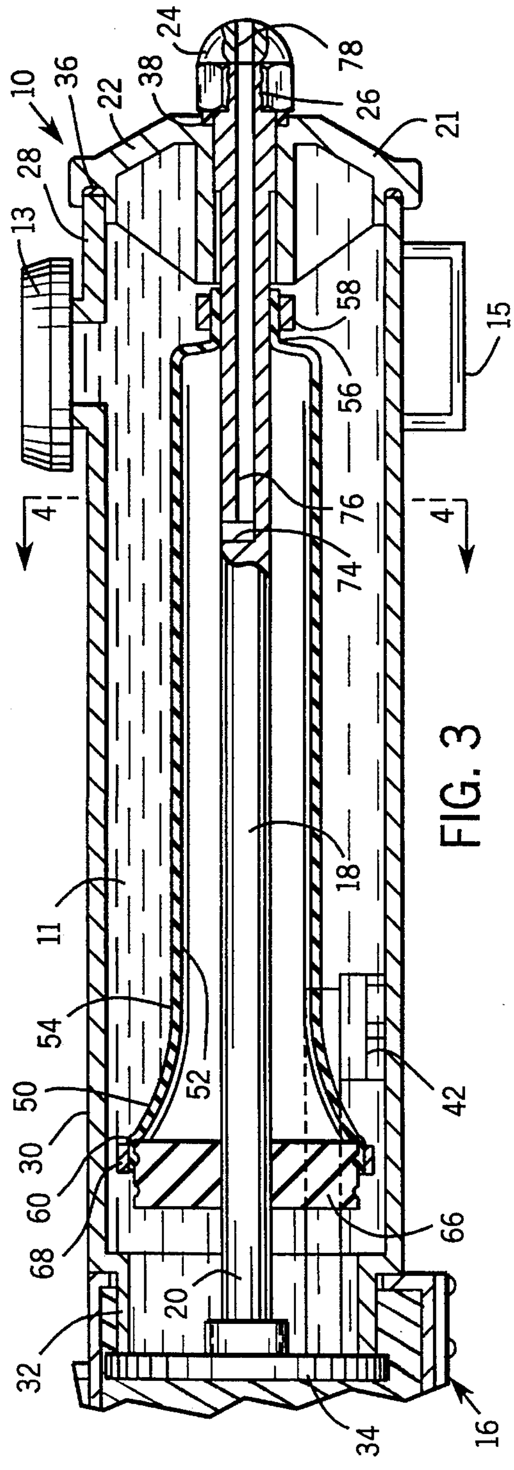
FIG. 3 is a fragmentary cross-sectional view similar to FIG. 1 but showing the reservoir partially depleted.
Figure 5:
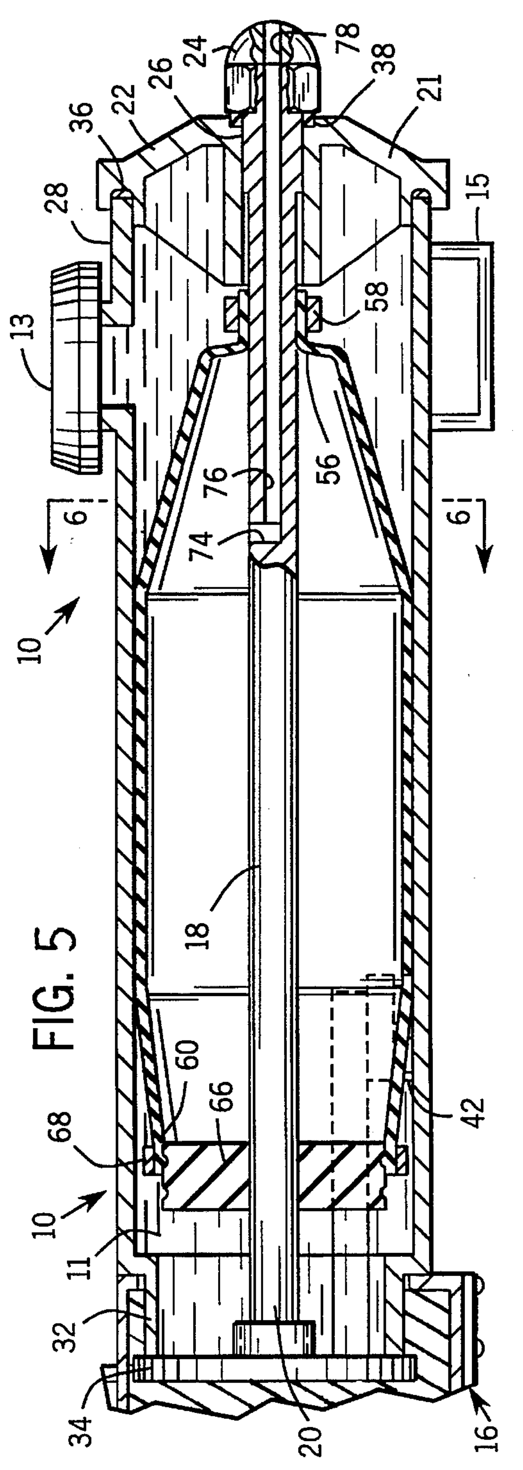
FIG. 5 is a fragmentary cross-sectional view similar to FIG. 3 but with more fluid depleted from the reservoir.
Figures 2, 4, 6, 7, 8, 9:
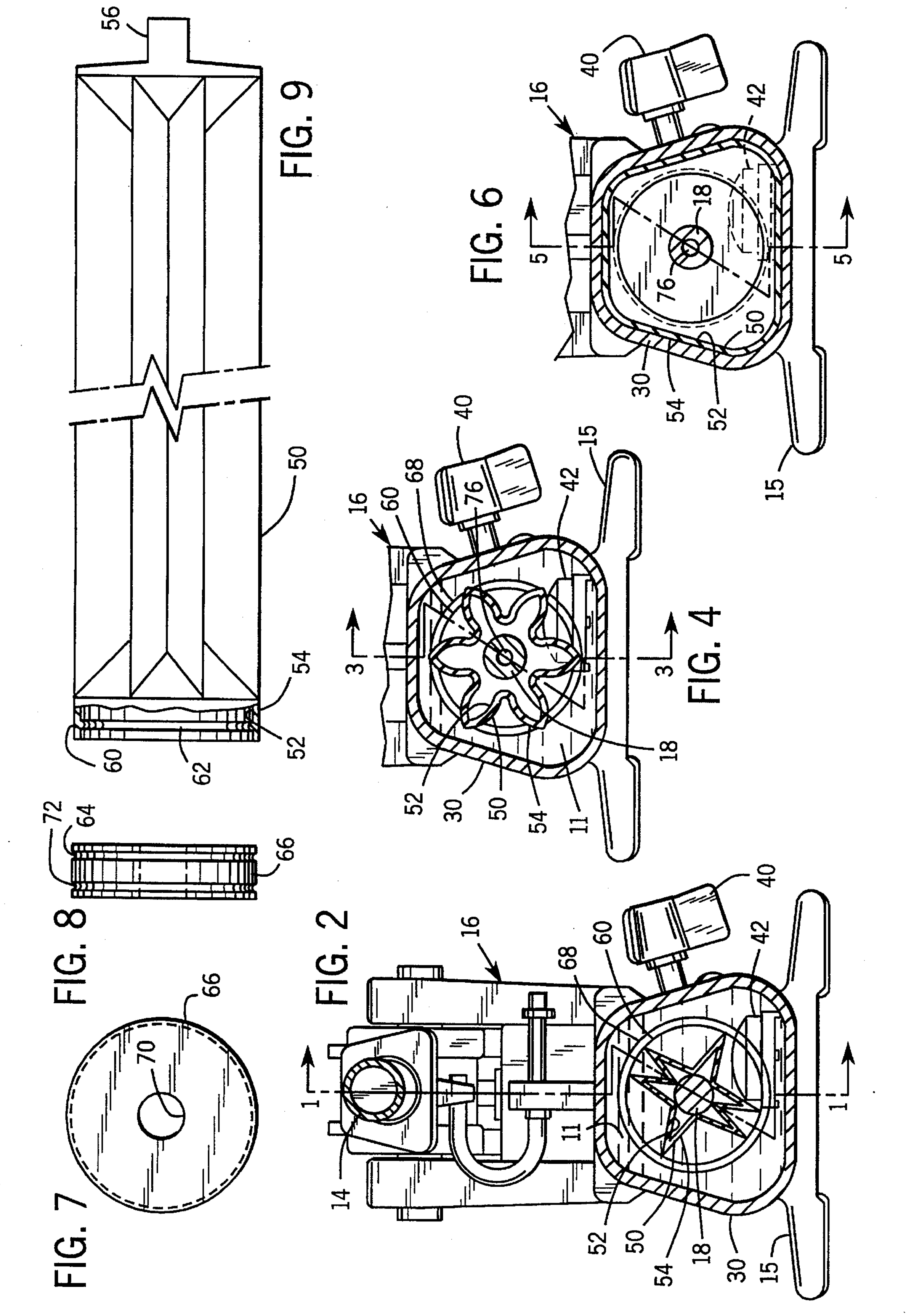
FIG. 2 is a cross-sectional view of the pump of FIG. 1 as viewed from the plane of the line 2—2 of FIG. 1.
FIG. 4 is a fragmentary cross-sectional view as viewed from the plane of the line 4—4 of FIG. 3.
FIG. 6 is a fragmentary cross-sectional view as viewed from the plane of the line 6—6 of FIG. 5.
FIG. 7 is an end elevation view of a end plug for the reservoir shown in the preceding figures.
FIG. 8 is a side elevation view of the end plug of FIG. 7.
FIG. 9 is a fragmentary elevation view of the bladder incorporated in the reservoir shown in FIGS. 1–6.

To allow hydraulic fluid to be withdrawn from the fluid chamber 11 without creating an excessive vacuum in the fluid chamber 11, a bladder 50 is provided inside the reservoir 10 which distends when fluid is drawn from the reservoir 10 and collapses when fluid is replenished to the reservoir 10. To understand this, it is helpful to refer to FIGS. 1–6. In FIGS. 1 and 2, the reservoir 10 contains more hydraulic fluid than in FIGS. 3 and 4, and the reservoir 10 in FIGS. 3 and 4 contains more hydraulic fluid than it does in FIGS. 5 and 6. As shown in FIGS. 1 and 2, with relatively the most fluid in the reservoir, so that the reservoir 10 could be said to be full, the bladder 50 is relatively collapsed.

In the position shown in FIGS. 1 and 2, the vented air volume contained within the bladder 50 is the smallest and the volume of fluid contained in the chamber 11 is the largest. In the position shown in FIGS. 3 and 4, wherein some hydraulic fluid has been depleted from the chamber 11, the bladder 50 has expanded in internal volume, corresponding to the volume of fluid withdrawn from the reservoir 10. In the position shown in FIGS. 5 and 6, the bladder 50 has expanded to the point in which a significant portion of its center section has assumed the trapezoidal shape of the body 30, closely hugging the interior walls of the body 30 throughout a substantial portion of its length.

The bladder 50 is made in the form of a tube having an interior surface 52 and an exterior surface 54. As shown in FIGS. 2 and 9, the bladder 50 is longitudinally pleated so that it has a 6 pointed star shape between its distal 56 and proximal 60 ends. The tie-rod 18 extends through the bladder 50. A fluid tight seal is created between the distal end 56, where a reduced diameter nipple is formed, and the tie-rod 18 by a ring-like clamp 58 which may for example be a screw type hose clamp. At the proximal end 60 of the bladder 50, the bladder 50 is formed to have a relatively larger diameter with an internal bead 62 formed. The internal bead 62 is received within a correspondingly shaped groove 64 formed in the exterior cylindrical surface of an end plug 66 which is received within the proximal end 60. A ring type clamp 68 of any suitable type such as a screw type hose clamp encircles the exterior of the proximal end 60 to create a fluid tight seal between the proximal end 60 and the end plug 66. The end plug 66 has a central hole 70 which receives the tie-rod 18 in an interference fit so as to create a fluid tight seal between the end plug 66 and the tie-rod 18.

The end plug 66 is preferably made of a relatively hard elastomer, such as nitrile having a hardness of 75–85 durometer Shore A. This creates a seal with the tie-rod 18 while still allowing the end plug 66 to be slid to the desired longitudinal position along the tie-rod 18.

The bladder 50 is also preferably made of an extensible material, such as an elastomer. For example, in the preferred embodiment nitrile having a hardness of 50–60 durometer Shore A and a wall thickness of 0.025–0.035 inches is used. However, the invention contemplates that other shapes of bladder, other materials, and even nonextensible materials may be used for the bladder 50.

The end plug 66 is preferably longer than necessary to seal against the proximal end 60 of the tie-rod 18 and a second groove 72 is provided in the cylindrical surface of the end plug 66. The second groove 72 is provided so that a second bladder, which could be the same as the bladder 50, can be sealed to the exterior surface of the end plug 66 so as to accommodate a longer reservoir 10.

To prevent a vacuum from being drawn within the bladder 50 when hydraulic fluid is depleted from the fluid chamber 11, the interior of the bladder 50 is vented to the exterior of the reservoir 10 through passageways 74 and 76 in the tie-rod 18 and passageway 78 in the nut 24. Thus, air is sucked through the passageways 74 and 76 into the interior of the bladder 50 when hydraulic fluid is depleted from the reservoir 10 and is exhausted through the passageways 74, 76 and 78 when the fluid is replenished to the reservoir 10.

Since no vent is provided through which hydraulic fluid may leak, the reservoir 10 may be used in any position. Also, the absence of such a vent reduces the chance of contaminants or air entering the hydraulic fluid. In addition, the reservoir 10 can be made in virtually any shape since the bladder 50 can distend to accommodate it. In addition, since the hydraulic fluid is not exposed to the exterior of the reservoir 10, such as may be the case with other types of vents, the reservoir 10 could be used under water, with water instead of air entering the bladder 50 when hydraulic fluid is drawn from the reservoir. Of course, the reservoir could also be used under fluids other than water.

The invention also provides a fast low pressure advance possibility. This could be accomplished by applying an air pressure or other fluid pressure at the end of passageway 78 which would pressurize the interior of the bladder 50 and therefore pressurize the interior of the reservoir 10. This could be used to pump hydraulic fluid out of the reservoir 10 through the working unit 16 up to a certain pressure. When that pressure was reached, the hand pump 12 could be operated as normal to draw additional hydraulic fluid from the fluid chamber 11 and supply it to the load under higher pressures.

Many modifications and variations to the preferred embodiment described will be apparent to those of ordinary skill in the art which will still incorporate the spirit of the invention. For example, the invention could be used with reservoirs of other constructions, for example, with a reservoir which does not have a tie-rod, and could be used with other types of working units, for example, an air or electric powered pump. Therefore, the invention should not be limited to the preferred embodiment described, but should be defined by the claims which follow.

I claim:

1. In a hydraulic fluid reservoir for a hydraulic working unit, said reservoir having an interior fluid chamber and an exterior, and being secured to said working unit by a tie rod which extends through said fluid chamber, said fluid chamber containing fluid which is drawn out or replenished according to the demands of said working unit, an improvement wherein a generally tubular flexible bladder resides in the fluid chamber of said reservoir coaxially with and around said tie rod so as to envelop a portion of said tie rod, said bladder having an exterior and an interior, said exterior being exposed to fluid in said fluid chamber and said tie rod extending through said interior and through opposed ends of said bladder, means sealing against fluid communication between said fluid chamber exterior of said bladder and said interior of said bladder, and a vent passageway in said tie rod providing fluid communication between said interior of said bladder and said exterior of said reservoir.

2. The improvement of claim 1, wherein said bladder is pleated.

3. The improvement of claim 1, wherein said bladder is extensible.

4. The improvement of claim 3, wherein said bladder is made of an elastomer.

5. The improvement of claim 1, wherein said sealing means includes an end plug, and said tie-rod extends through said end plug with a fluid-tight seal between said end plug and said tie-rod and said bladder is sealed to said end plug.

6. The improvement of claim 5, wherein said end plug includes means for sealing two bladders to it end to end.

* * * * *